(12) United States Patent
Thulasi et al.

(10) Patent No.: US 11,050,623 B2
(45) Date of Patent: Jun. 29, 2021

(54) MANAGING VIRTUAL NETWORK FUNCTIONS

(71) Applicant: HEWLETT PACKARD ENTERPRISE DEVELOPMENT LP, Houston, TX (US)

(72) Inventors: Arun Thulasi, Sunnyvale, CA (US); Tariq Khan, Lindenhurst, NY (US); Leonid Isaevich Popokh, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/772,316

(22) PCT Filed: Oct. 30, 2015

(86) PCT No.: PCT/US2015/058465
§ 371 (c)(1),
(2) Date: Apr. 30, 2018

(87) PCT Pub. No.: WO2017/074461
PCT Pub. Date: May 4, 2017

(65) Prior Publication Data
US 2018/0316559 A1 Nov. 1, 2018

(51) Int. Cl.
*G06F 15/177* (2006.01)
*H04L 12/24* (2006.01)

(52) U.S. Cl.
CPC .......... *H04L 41/0843* (2013.01); *H04L 41/00* (2013.01); *H04L 41/082* (2013.01); *H04L 41/5041* (2013.01)

(58) Field of Classification Search
CPC ....... G06F 9/45558; G06F 2009/45595; H04L 41/00; H04L 41/082; H04L 41/0843; H04L 41/5041
(Continued)

(56) References Cited

U.S. PATENT DOCUMENTS

| 9,003,406 | B1 * | 4/2015 | Hodge | G06F 8/61 718/1 |
| 9,146,721 | B1 * | 9/2015 | Nagaraja | G06F 9/5077 |

(Continued)

FOREIGN PATENT DOCUMENTS

| CN | 104219127 A | 12/2014 |
| CN | 104410672 A | 3/2015 |

(Continued)

OTHER PUBLICATIONS

Extended European Search Report, EP Application No. 15907546.4, dated Feb. 7, 2018, pp. 1-7, EPO.

(Continued)

*Primary Examiner* — Dustin Nguyen
*Assistant Examiner* — Ihao H Nguyen
(74) *Attorney, Agent, or Firm* — Dicke, Billig & Czaja, PLLC

(57) ABSTRACT

Examples disclosed herein include a method of managing virtual network functions of a network functions virtualization (NFV) network environment includes generating an integration virtual network function (integration VNF) to allow a user to perform tasks related to integration and deployment of a first virtual network function (first VNF), and generating an orchestration template for a first virtual network function (first VNF) with an NFV orchestrator of the NFV environment. The method further includes reviewing the orchestration template with the integration VNF, and orchestrating deployment of the first VNF with a virtual infrastructure manager (VIM) of the NFV environment based on the orchestration template.

18 Claims, 4 Drawing Sheets

(58) Field of Classification Search
USPC ........ 709/220, 223, 224, 225, 226; 717/168, 717/171, 174, 176; 718/1, 100
See application file for complete search history.

(56) References Cited

U.S. PATENT DOCUMENTS

| | | | |
|---|---|---|---|
| 9,774,541 B1* | 9/2017 | Herzog | H04L 47/78 |
| 2014/0075021 A1* | 3/2014 | Revanuru | H04L 43/04 |
| | | | 709/224 |
| 2014/0201374 A1* | 7/2014 | Ashwood-Smith | H04L 49/70 |
| | | | 709/226 |
| 2014/0297395 A1* | 10/2014 | Chao | G06Q 30/0201 |
| | | | 705/14.41 |
| 2014/0317261 A1* | 10/2014 | Shatzkamer | G06F 9/45558 |
| | | | 709/223 |
| 2015/0063166 A1* | 3/2015 | Sif | G06F 9/45558 |
| | | | 370/254 |
| 2015/0082308 A1 | 3/2015 | Kiess et al. | |
| 2015/0180730 A1* | 6/2015 | Felstaine | G06F 11/0793 |
| | | | 709/225 |
| 2015/0215228 A1* | 7/2015 | McMurry | H04L 47/822 |
| | | | 709/226 |
| 2015/0234725 A1* | 8/2015 | Gillis | G06F 11/263 |
| | | | 714/33 |
| 2016/0112261 A1* | 4/2016 | Amato | H04L 67/10 |
| | | | 709/220 |
| 2017/0187572 A1* | 6/2017 | Wu | H04L 29/08 |
| 2018/0121227 A1* | 5/2018 | Peng | G06F 9/5077 |
| 2018/0213402 A1* | 7/2018 | Harris | H04W 12/08 |
| 2019/0268269 A1* | 8/2019 | Connor | H04L 47/2441 |
| 2020/0192651 A1* | 6/2020 | Mudumbai | H04L 41/14 |

FOREIGN PATENT DOCUMENTS

| | | |
|---|---|---|
| EP | 3082295 A1 | 10/2016 |
| WO | WO-2015100834 A1 | 7/2015 |

OTHER PUBLICATIONS

Felicia Lobillo et al., "Specification of the Network Function Framework and T-nova Marketplace," Sep. 30, 2014, pp. 1-103, Version 1.0, T-NOVA Consortium.

International Search Report and Written Opinion, International Application No. PCT/US2015/058465, dated Jul. 8, 2016, pp. 1-9, KIPO.

* cited by examiner

MANAGING VIRTUAL NETWORK FUNCTIONS

BACKGROUND

"Network Functions Virtualization" is an emerging design approach, particularly in the telecommunications industry, to transform physical network functions into "Virtual Network Functions" by implementing physical network functions as software that can be hosted and run on a range of standard hardware, such as blade servers, for example.

DETAILED DESCRIPTION

Figure 1:
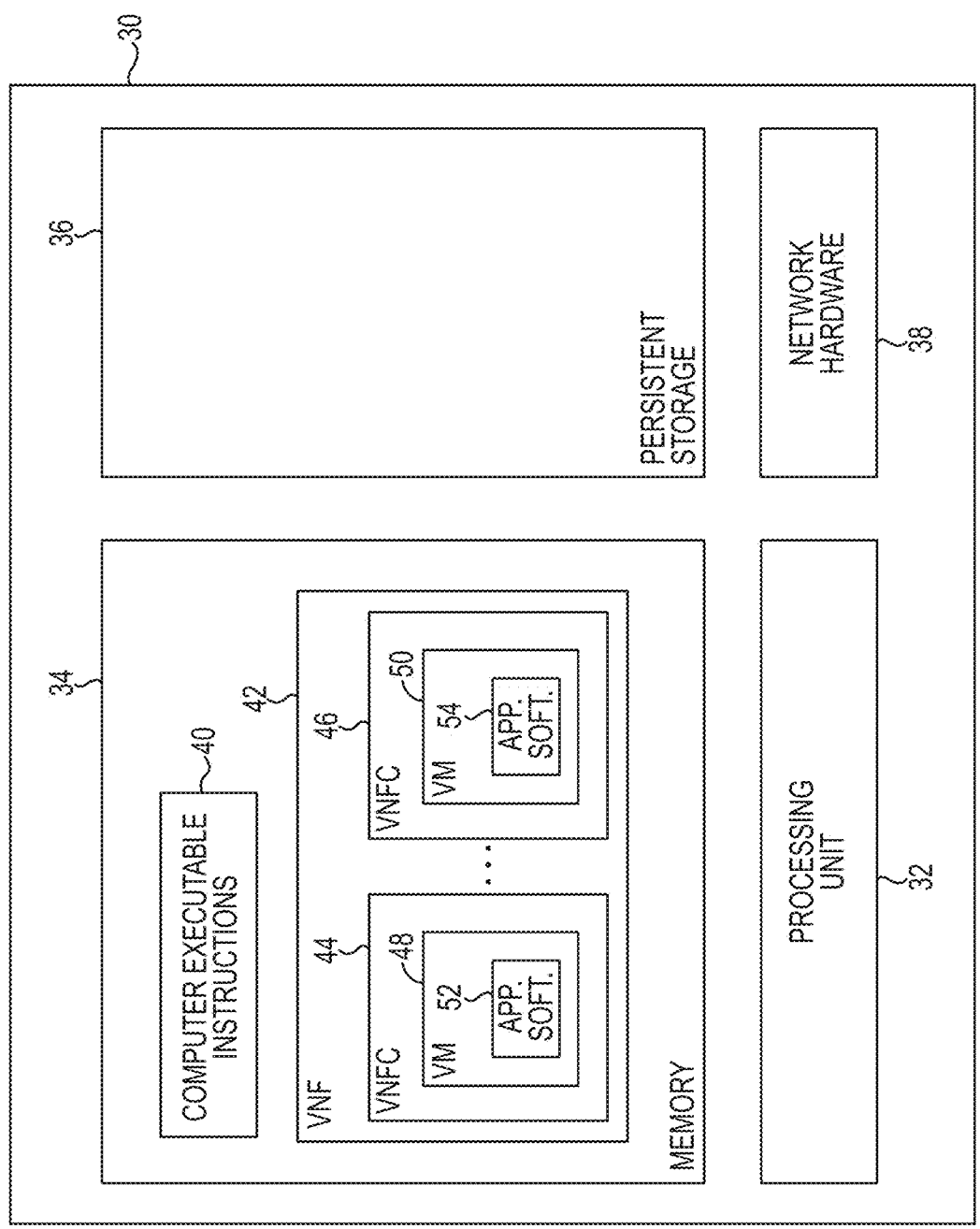
FIG. 1 is a block diagram illustrating a virtual network function (VNF) management system according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Network functions and services have traditionally been provided on dedicated and proprietary hardware appliances. Examples of such network functions, also known as physical network functions (PNFs), include firewalls, load balancers, deep packet inspectors, and network address translators, to name just a few. Traditionally, physical network functions involve physical installation at each site where such functions are provided.

Network Functions Virtualization (NFV) may be used to transform physical network functions into "Virtual Network Functions" by implementing physical network functions as software that can be hosted and run on a range of standard hardware, such as blade servers, for example.

Over time, as network services and functions have evolved and expanded, networks have become populated with an ever increasing variety of proprietary hardware appliances. Increasing the capacity of existing PNFs and launching of new network services often involves adding additional numbers of existing types of hardware appliances to the network or creating and adding entirely new types of hardware appliances to the network. In addition to the provision of the hardware appliances themselves, finding space and providing power/cooling to accommodate such hardware appliances, as well as the increasing complexity of integrating and deploying these appliances in the network is becoming ever more difficult and costly. Furthermore, physical hardware appliances rapidly reach end of life, and hardware lifecycles are becoming shorter as innovation accelerates, thereby increasing repetition of the procure-design-integrate-deploy cycle, reducing the return on investment of deploying new services, and constraining innovation in an increasingly network-centric world.

NFV may be used to transform network functions (NFs) previously performed via proprietary hardware appliances into Virtual Network Functions (VNFs) by implementing the NFs as application software that can be run on a range of standardized, high-volume servers, switches, and storage that can be located in datacenters, network nodes, and in end user premises, for example.

Virtualizing NFs ends the dependency between a NF and its hardware (as is the case with physical hardware appliances) by creating a standardized execution for VNFs. This enables the sharing of physical hardware by multiple VNFs, wherein the pooling of hardware, in-turn, enables the sharing of NFV Infrastructure (NFVI) resources.

The use of VNFs also avoids the cost and complexities of designing and installing unique hardware appliances for each NF, with each hardware appliance having different power, cooling, and space needs, and also reduces power consumption and cooling costs. As will be described in greater detail below, NFV enables networks to adapt more quickly to rapidly and frequently changing network requirements and services as compared to proprietary hardware appliances, which can take several weeks to months to install when considering the equipment design-build-procure process with vendors, and shipping, installation, and testing times.

A VNF may include a plurality of VNF Components (VNFCs) of a plurality of types, with each VNFC being realizable by various technologies, including by Virtual Machines (VMs) executing application software. A VM is a software implementation of a machine (e.g., a computer) that executes programs like a physical machine. VMs enable a host computer to run multiple application environments or operating systems simultaneously on the same computer. The host computer allots a certain amount of the host's resources to each VM, and each VM is then able to use the allotted resources to execute application software, including operating systems. A VM virtualizes the underlying hardware of the host computer or emulated hardware devices, making the use of the VM transparent to the operating system or to the user of the application software.

VMs on a host computer are typically managed by application software referred to as a Hypervisor. Among operations that a Hypervisor may perform are operations to create, start, stop, hibernate, activate, deactivate, and delete a VM. To create a VM, a Hypervisor may use an Image File stored on some persistent storage media. The Image File contains an operating system application and other application software that will be started when the Hypervisor creates a VM from the Image File.

The Hypervisor and associated application software may also attach the VM to virtual networks that, in-turn, may be connected to physical networks so that the VM can communicate with other entities, including other VMs inside or outside the Hypervisor and with external physical devices attached to the networks, including devices on the Internet and on radio access networks handling network communications from mobile devices, for example.

NFV allows Telecom and Communications Service Providers companies, for example, to move away from proprietary, appliance-based and monolithic technologies and embrace open, multi-layered technologies. NFV aims to bring Information Technology (IT) virtualization technologies to go with Telco reliability to provide an environment that is cost-effective and resilient. A typical NFV environment may involve a complex and time consuming integration among various NFV components. One example is directed to operationalizing and delivering a dynamic NFV environment such that various enhancements built in different streams are continuously integrated, deployed and delivered (i.e., "Continuous-X").

A well-defined NFV architecture provides the underlying framework to be able to deploy a variety of VNFs, including core Telco workloads such as Customer Premises Equipment (CPE), Evolved Packet Core (EPC), etc., and standard enterprise workloads such as Firewalls, Load Balancers, Domain Name Servers (DNS), etc. Each of these VNFs has its own independent development cycle, roadmap and integration needs which impact the deployment of the overall NFV solution. Examples disclosed herein verify the integration and deployment of the VNFCs on a regular basis to provide smoother deployment and upgrade cycles. Examples disclosed herein continuously integrate and deploy VNFCs and provide eventless upgrades.

FIG. 1 is a schematic block diagram of a VNF management system 30 according to one example of the present disclosure. VNF management system 30 can include various systems and subsystems, and can be a personal computer, a laptop computer, a workstation, a computer system, an application specific integrated circuit (ASIC), a server, a server blade center (data center), and a server farm, among others, for example. VNF management system 30 includes a processing unit 32, including at least one processing core, a memory 34, persistent storage 36, and network hardware 38. Memory 34 stores machine executable instructions and can be implemented as a non-transitory computer-readable medium, such as, for example, random access memory. Persistent storage 36 can be any storage that is maintained independently of any process running on processing unit 32, such as disk storage, for example.

VNF management system 30 includes computer executable instructions 40 which are accessed and executed by processing unit 32, with computer executable instructions 40 providing instructions to provide a VNF, such as VNF 42, including a number (the number including the number "1") of VNFCs of a number (the number including the number "1") of different types, such as VNFCs 44 and 46, with each VNFC comprising a VM executing application software, such as VMs 48 and 50 executing application software 52 and 54, respectively.

Figure 2:
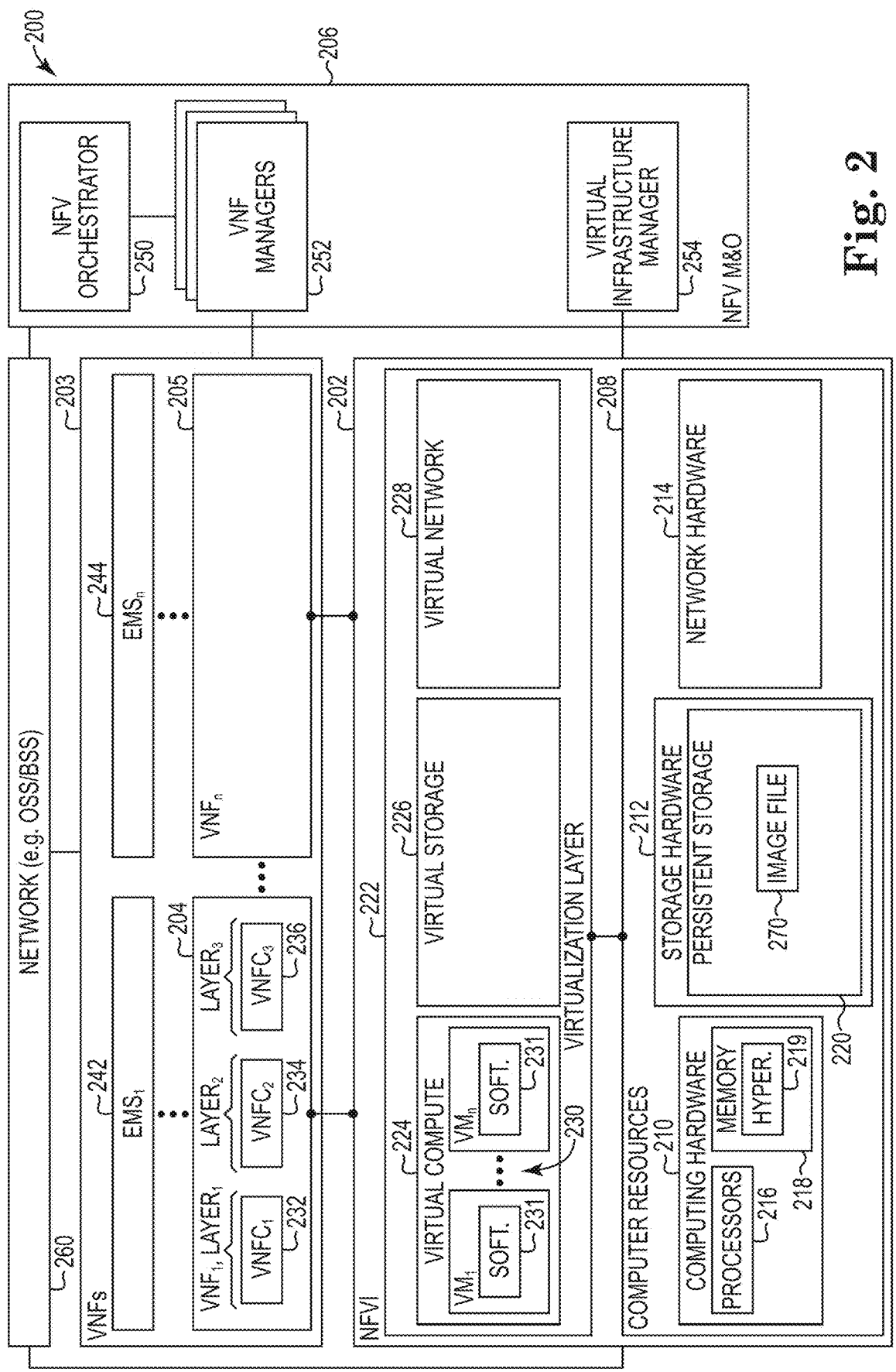
FIG. 2 is block diagram illustrating an example network functions virtualization (NFV) Architectural Framework in which examples of managing virtual network functions in accordance with the present disclosure can be implemented.

FIG. 2 is schematic block diagram illustrating an example NFV Architectural Framework 200 in which examples of managing virtual network functions in accordance with the present disclosure can be implemented. NFV Architectural Framework 200 includes a Network Functions Virtualization Infrastructure (NFVI) 202, a number of Virtualized Network Functions (VNF) 203, illustrated as $VNF_1$ to $VNF_n$ at 204 and 205, and NFV Management and Orchestration function (NFV M&O) 206. It is noted that NFV Architectural Framework 200 of FIG. 2 is based on an NFV architectural framework developed and described by the Network Functions Virtualization Industry Specification Group (NFV ISG) of the European Telecommunications Standards Institute (ETSI), and NFV M&O 206 corresponds to the Management & Network Orchestration (MANO) layer defined by ETSI NFV architecture.

NFVI 202 provides the virtual resources to support the execution of VNFs, and includes commercial, off-the-shelf computer resources 208. Computer resources 208 include computing hardware 210, storage hardware 212, and network hardware 214, with computing hardware 210 including processors 216 and memory 218, and storage hardware 212 including persistent storage 220. In one example, a hypervisor 219 resides on computing hardware 210 and manages VMs on the host computing system 210. Persistent storage is defined as storage that is maintained independent of any process that is running on a processor, such as disk storage, for example. Hardware resources can comprise standardized, high-volume hardware, such as blade servers, for example, and can be disposed at any physical location on the network, such as in any number of data centers or other operational facilities that can geographically dispersed from another, including globally.

NFVI 202 further includes a virtualization layer 222 which includes a software layer that virtualizes and abstracts the underlying computer resources 208, and includes a virtual computing component 224, a virtual storage component 226, and a virtual network component 228. Virtual computing component 224 includes a number of VMs, indicated as $VM_1$ through $VM_n$ at 230, wherein individual VMs of $VM_1$ through $VM_n$ can be of different types. VNFs 203 represent the software implementation of a number of network functions, illustrated as $VNF_1$ to $VNF_n$ at 204 and 205, which are capable of running over NFVI 202. $VNF_1$ at 204, includes a number of virtual network function components (VNFCs), illustrated as $VNFC_1$ at 232, $VNFC_2$ at 234, and $VNFC_3$ at 236, with each VNFC comprising a VM executing application software, such as application software 231 being executed by one of VMs $VM_1$ to $VM_n$ at 230, wherein each VM 230 executing application software 231 forms a different VNFC. In one example, $VNFC_1$, $VNFC_2$, and $VNFC_3$ are each of a different VNFC type, with each VNFC type providing different functionality to VNF 204. In one example, a VNF, such as VNF 204, includes a number of layers, such as $Layer_1$, $Layer_2$, and $Layer_3$, with each layer providing different functionality of VNF 204 and each layer including all VNFCs of a same type. Although illustrated with respect to VNF 204, all VNFs can be structured in a similar fashion and include different numbers of VMs, VMFCs, and layers.

Each VNF can be accompanied by an Element Management System, such as element management systems EMS, at 242 and $EMS_n$ at 244. The element management systems, EMSs, are typically provided with the corresponding VNF, such as by the VNF vendor, such that each EMS is configured to the particularities of the corresponding VNF and provides monitoring and management of each VNF. VNF 204 is an entity corresponding to a physical network node, but as opposed to hardware appliances, provides the node as software free from hardware dependency.

NFV M&O 206 comprises software applications, including NFV Orchestrator 250, VNF Managers 252, and virtual infrastructure manager (VIM) 254, which cover orchestration and management of physical and/or software resources that support the infrastructure virtualization and management of the VNFs. NFV M&O 206 performs virtualization-specific management tasks in NFV architecture framework 200, and interacts with the external landscape, such as the Operations Support Systems/Business Support Systems (OSS/BSS) landscape 260, which enables NFV to be integrated into an existing network-wide management landscape.

NFV Orchestrator 250 may either directly or indirectly through other systems (e.g., VIM 254) direct Hypervisor 219 to create, delete, start, stop, hibernate, and activate VMs, such as VMs executing application software and forming VNFCs.

Each individual VNF manager in the VNF managers 252 may be specific to an associated one of the VNFs 203, and may manage its associated VNF based on its understanding of performance requirements of the VNF.

A VIM, such as VIM 254, is application software that tracks and manages all VMs hosted on a given set of hardware resources (e.g., a given blade-type server at a particular location, such as data center, for instance), such as all active VMs 230. The VIM 254 tracks the state of VMs on the given set of hardware resources (e.g., active, stopped, and hibernated), hardware resources assigned to each VM, and hardware resources available, among other information.

In one example, NFV Orchestrator 250, via VIM 254, directs hypervisor 219 to create a number of VMs for a number of VNFCs of VNF 204, and to load application software onto each VM such that, when executed by the VM, the VM forms the corresponding VNFC. In one example, the application software includes an operating system application. In one example, as described above, hypervisor 219 uses an image file stored on a persistent storage, such as Image File 270 stored on persistent storage 220, where the Image File contains the application software that will be started whenever hypervisor 219 creates a VM from the Image File, with different image files being employed for creating different VMs.

In contrast to a VNF manager 252, which tracks one corresponding VNF, NFV Orchestrator 250 tracks all VNFs operating on the network, the types of each VNFC and the number of VMs of each VNFC type, the performance of all VNFs, hardware resources assigned to each VNF, and hardware resources which are available for assignment (such as from VIM 254, for example).

Although not illustrated as such, it is noted that, according to other examples, NFV Orchestrator 250, VNF Managers 252, VIM 254, and hypervisor 219, as well as other components of a VNF management system may also be realized as application software executed by VMs.

Figure 3:
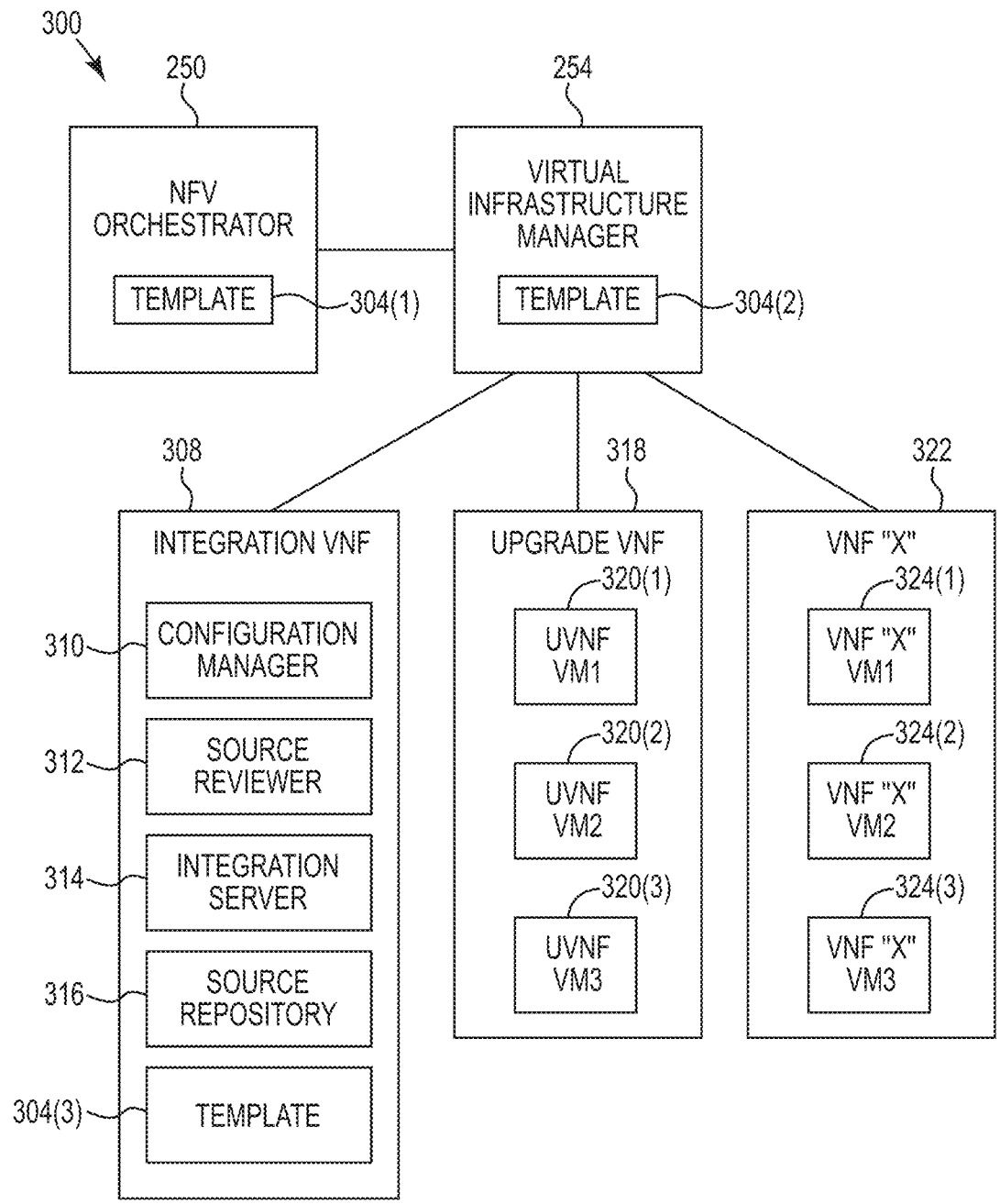
FIG. 3 is a block diagram illustrating a system for managing deployment and updating of VNFs according to one example.

FIG. 3 is a block diagram illustrating a system 300 for managing deployment and updating of VNFs according to one example. System 300 includes NFV orchestrator 250 and VIM 254, which are part of the NFV M&O layer 206 shown in FIG. 2. NFV orchestrator 250 provides orchestration capabilities at the NFV-Orchestration layer, and VIM 254 provides template-based orchestration capabilities at the Virtual Infrastructure layer. System 300 according to one example defines the change control process for VNFs and streamlines the deployment of VNFs and their subsequent upgrades. In one example, VNF deployments are orchestrated through orchestration templates created and/or managed by NFV orchestrator 250.

In operation according to one example, at the start of a deployment of a VNF "X" 322, NFV orchestrator 250 initiates a request to VIM 254 to create and orchestrate an Integration VNF 308 as part of the deployment. The Integration VNF 308 includes four VM instances that run a configuration manager 310, a source reviewer 312, an integration server 314, and a source repository 316. These VMs 310, 312, 314, and 316 may be configured using cloud-init or a configuration manager to set permissions for users and administrators to perform tasks related to the continuous integration, deployment, and delivery of VNFs. In one example, VMs 310, 312, 314, and 316 may be implemented with Chef, Gerrit, Jenkins, and Git tools, respectively, which are open source DevOps tools.

Once the deployment architecture of the VNF "X" 322 is determined, an orchestration template 304(1) is created to orchestrate the VNF "X" 322 within VIM 254. The orchestration template 304(1) may be created by NFV orchestrator 250 based on a data model for the VNF 322, or built by a different element absorbed into the NFV orchestrator 250 to create the data model. The template 304(1) is passed to VIM 254, as represented by template 304(2), and is then submitted to the source reviewer 312 of the integration VNF 308, as represented by template 304(3), for review. If the source reviewer 312 accepts the template 304(3), the source reviewer 312 stores the template 304(3) in the source repository 316. The various versions of the orchestration template 304(1)-304(3) are generally referred to herein as orchestration template 304.

NFV orchestrator 250 retrieves the latest version of the orchestration template 304 from the source repository 316, and passes it to VIM 254 for each tenant/user as applicable. This results in the creation of VNF "X" 324(1)-324(3), which represent VM instances of the VNF "X" 322. This facilitates consistency across deployments. Although three instances 324(1)-324(3) are shown in this example, it is noted that more or less than three instances 324(1)-324(3) may be used in other examples.

At the start of the deployment, VIM 254 creates an Upgrade VNF (UVNF) 318, which is dedicated specifically for upgrades and testing of the VNF "X" 322. UVNF 320(1)-320(3) are created, which represent VM instances of the Upgrade VNF 318 and correspond to VNF "X" 324(1)-324(3), respectively. Although three instances 320(1)-320(3) are shown in this example, it is noted that more or less than three instances 320(1)-320(3) may be used in other examples. NFV orchestrator 240 utilizes the Upgrade VNF 318 to verify the deployment and upgradeability of VNF "X" 322 before making changes for target tenants. Permitted users make changes to the template 304 and submit their changes to source reviewer 312. Once this code is reviewed, it is setup to start the testing process. NFV orchestrator 250 then uses the integration server 314 to verify the updated template 304. On the invocation by NFV orchestrator 250, the integration server 314 creates a new VNF using the previous version of the template 304 and updates the VNF using the latest version of the template 304. The VNF test plan is then orchestrated and on successful completion, the new template 304 is promoted in the source repository 316. On the availability of a new template 304, NFV Orchestrator 250 picks it up and updates the VNF for the target tenant.

In one example, VNF deployments provided by system 300 are based on orchestration templates 304 created and/or managed by NFV orchestrator 250. Customer NFV environments may be deployed, upgraded, and deactivated by invoking the appropriate templates 304 identified by the NFV orchestrator 250. System 300 according to one example uses a Continuous Integration (CI)/Continuous Deployment (CD) process built around VMs 310-316 for source code management, reviews, and integration testing, and provides continual integration, deployment, and delivery of VNFs in NFV deployments.

Examples disclosed herein conform to NFV MANO specifications from ETSI, while supporting flexible and extensible descriptor models (e.g., VNFD, and Network Scenario Descriptor (NSD)), and support the concept of VNF, VNFM, EMS, Network Scenario (NS), as well as others. Standardized interfaces to NFV ecosystem components are provided by VIM 254 interface to VNFM, which is extensible to support any interface published by EMS systems (e.g., support for any VNF vendor). Examples disclosed herein support both VNFM-VIM direct and VIM Proxy model of operation as specified by ETSI. Examples disclosed herein also provide hypervisor support, such as for KVM and VMware, and are extensible to support other hypervisors (on demand) and containers.

Figure 4:
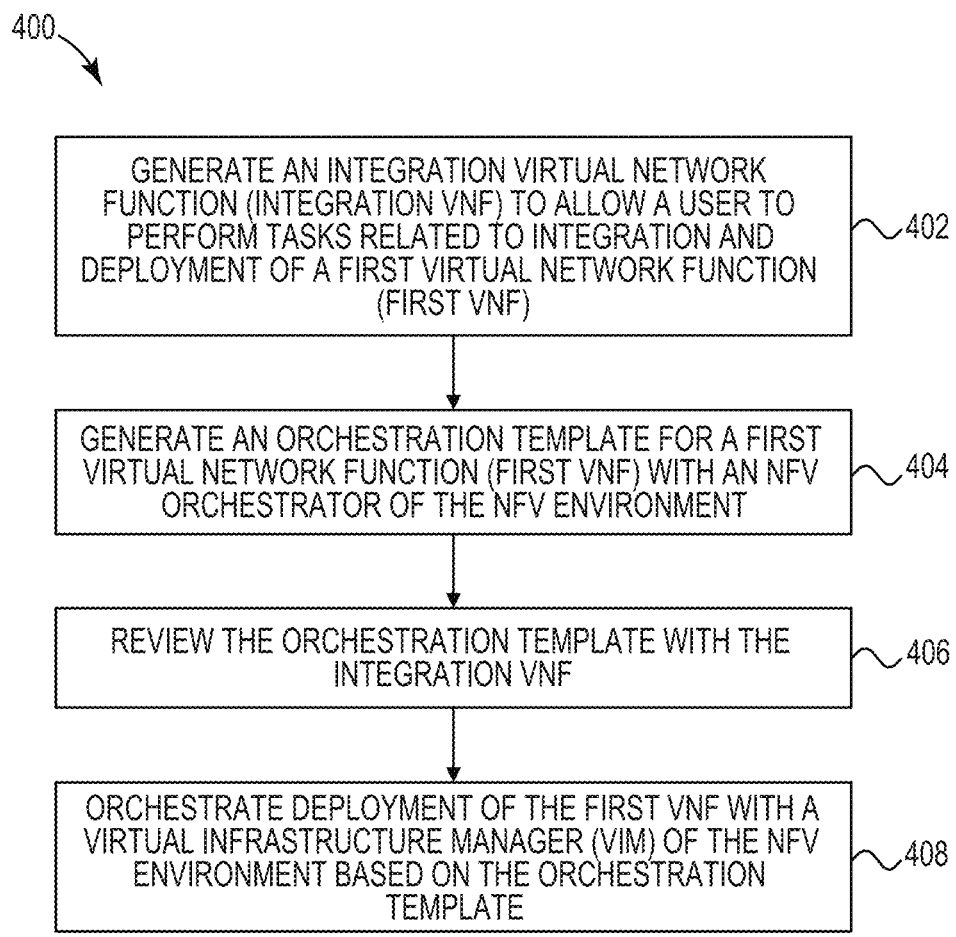
FIG. 4 is a flow diagram illustrating a method of managing virtual network functions in a network functions virtualization (NFV) network environment according to one example.

One example is directed to a method of managing VNFs in an NFV network environment. FIG. 4 is a flow diagram illustrating a method 400 of managing VNFs in an NFV network environment according to one example. At 402 in method 400, an integration virtual network function (integration VNF) is generated to allow a user to perform tasks related to integration and deployment of a first virtual network function (first VNF). At 404, an orchestration template for a first virtual network function (first VNF) is generated with an NFV orchestrator of the NFV environment. At 406, the orchestration template is reviewed with the integration VNF. At 408, the method 400 orchestrates deployment of the first VNF with a virtual infrastructure manager (VIM) of the NFV environment based on the orchestration template.

Method 400 may further include generating an upgrade virtual network function (upgrade VNF) for facilitating upgrading of the first VNF. Method 400 may further include generating an updated version of the orchestration template based on user changes, reviewing the updated version of the orchestration template with the integration VNF, and orchestrating deployment of an updated version of the first VNF with the VIM based on the updated version of the orchestration template. In one example, the first VNF includes a number of VNF components (VNFCs), each VNFC comprising a virtual machine (VM) executing application software. In one example, the integration VNF includes a configuration manager virtual machine (VM), a source reviewer VM, an integration server VM, and a source repository VM. The network orchestrator and the VIM may be implemented in a management and network orchestration layer of the NFV network environment.

Another example is directed to a virtual network function (VNF) management system for a network functions virtualization (NFV) network environment, and includes an NFV orchestrator to generate an orchestration template for a first virtual network function (first VNF), and an integration virtual network function (integration VNF) to allow a user to perform tasks related to integration and deployment of the first VNF, and to review the orchestration template. The system also includes a virtual infrastructure manager (VIM) to orchestrate deployment of the first VNF based on the orchestration template.

The VNF management system may further include an upgrade virtual network function (upgrade VNF) for facilitating upgrading and testing of the first VNF. In one example, the integration VNF reviews an updated version of the orchestration template, and the VIM orchestrates deployment of an updated version of the first VNF based on the updated version of the orchestration template. The integration VNF may include a configuration manager virtual machine (VM), a source reviewer VM, an integration server VM, and a source repository VM.

Yet another example is directed to a non-transitory computer readable medium comprising executable instructions to: generate an integration virtual network function (integration VNF) to allow a user to perform tasks related to integration and deployment of a first virtual network function (first VNF) in a network functions virtualization (NFV) network environment; generate an orchestration template for a first virtual network function (first VNF); review the orchestration template with the integration VNF; orchestrate deployment of the first VNF in the NFV network environment based on the orchestration template; and generate an upgrade virtual network function (upgrade VNF) to facilitate upgrading and testing of the first VNF. The non-transitory computer readable medium may further include executable instructions to: generate an updated version of the orchestration template based on user changes; and orchestrate deployment of an updated version of the first VNF based on the updated version of the orchestration template.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of managing virtual network functions in a network functions virtualization (NFV) environment, the method comprising:
generating, by an NFV orchestrator, an orchestration template for a first virtual network function (first VNF), wherein the orchestration template is based on a data model for the first VNF and defines a change control process for upgrading VNFs, wherein the orchestration template is identified and invoked to deploy the VNFs;
storing the orchestration template in a source repository;
retrieving, by the NFV orchestrator, the orchestration template in the source repository;
generating a first upgrade VNF prior to generating a second upgrade VNF, wherein the first upgrade VNF is generated using specifications from the orchestration template, wherein the first upgrade VNF is dedicated to upgrading or testing the first VNF used to generate the orchestration template;
generating an integration virtual network function (integration VNF) to allow a user to perform tasks related to integration and deployment of the first upgrade VNF and the second upgrade VNF;
verifying the integration and deployment of the first upgrade VNF, wherein the verification confirms accuracy of the integration and deployment of the first upgrade VNF prior to generating the second upgrade VNF; and
responsive to the integration VNF confirming the accuracy of the first upgrade VNF deployment, orchestrating deployment of the second upgrade VNF with a virtual infrastructure manager (VIM) of the NFV environment based on the orchestration template.

2. The method of claim 1, and further comprising:
generating an updated version of the orchestration template based on a user change.

3. The method of claim 2, and further comprising:
reviewing the updated version of the orchestration template with the integration VNF.

4. The method of claim 3, and further comprising:
orchestrating deployment of an updated version of the first VNF with the VIM based on the updated version of the orchestration template.

5. The method of claim 1, wherein the first VNF includes a number of VNF components (VNFCs), each VNFC comprising a virtual machine (VM) executing application software.

6. The method of claim 1, wherein the integration VNF includes a configuration manager virtual machine (VM), a source reviewer VM, and an integration server VM.

7. The method of claim 6, wherein the integration VNF further includes a source repository VM.

8. The method of claim 1, wherein the NFV orchestrator and the VIM are implemented in a management and network orchestration layer of the NFV environment.

9. A virtual network function (VNF) management system for a network functions virtualization (NFV) environment, comprising:
 a processor; and
 a memory having machine executable instructions stored thereon which, when executed by the processor, cause the processor to:
  generate an orchestration template for a first virtual network function (first VNF), wherein the orchestration template is based on a data model for the first VNF and defines a change control process for upgrading VNFs, wherein the orchestration template is identified and invoked to deploy the VNFs;
  store the orchestration template in a source repository;
  retrieve the orchestration template in the source repository;
  generate a first upgrade VNF prior to generating a second upgrade VNF, wherein the first upgrade VNF is generated using specifications from the orchestration template, wherein the first upgrade VNF is dedicated to upgrading or testing the first VNF used to generate the orchestration template;
  generate an integration virtual network function (integration VNF) to allow a user to perform tasks related to integration and deployment of the first upgrade VNF and the second upgrade VNF in a network functions virtualization (NFV) environment;
  verify integration and deployment of the first upgrade VNF, wherein the verification confirms accuracy of the integration and deployment of the first upgrade VNF prior to generating the second upgrade VNF; and
  responsive to the integration VNF confirming the accuracy of the first upgrade VNF deployment, orchestrate deployment of the second upgrade VNF in the NFV environment based on the orchestration template.

10. The VNF management system of claim 9, wherein the machine executable instructions, when executed by the processor, further cause the processor to:
 generate an updated version of the orchestration template; and
 orchestrate deployment of an updated version of the first VNF based on the updated version of the orchestration template.

11. The VNF management system of claim 9, wherein the integration VNF includes a configuration manager virtual machine (VM), a source reviewer VM, an integration server VM, and a source repository VM.

12. A non-transitory computer readable medium comprising executable instructions to:
 generate an orchestration template for a first virtual network function (first VNF), wherein the orchestration template is based on a data model for the first VNF and defines a change control process for upgrading VNFs, wherein the orchestration template is identified and invoked to deploy the VNFs;
 store the orchestration template in a source repository;
 retrieve the orchestration template in the source repository;
 generate a first upgrade VNF prior to generating a second upgrade VNF, wherein the first upgrade VNF is generated using specifications from the orchestration template, wherein the first upgrade VNF is dedicated to upgrading or testing the first VNF used to generate the orchestration template;
 generate an integration virtual network function (integration VNF) to allow a user to perform tasks related to integration and deployment of the first upgrade VNF and the second upgrade VNF in a network functions virtualization (NFV) environment;
 verify integration and deployment of the first upgrade VNF, wherein the verification confirms accuracy of the integration and deployment of the first upgrade VNF prior to generating the second upgrade VNF; and
 responsive to the integration VNF confirming the accuracy of the first upgrade VNF deployment, orchestrate deployment of the second upgrade VNF in the NFV environment based on the orchestration template.

13. The non-transitory computer readable medium of claim 12, and further comprising executable instructions to:
 generate an updated version of the orchestration template based on a user change; and
 orchestrate deployment of an updated version of the first VNF based on the updated version of the orchestration template.

14. The method of claim 3, further comprising testing and verifying the updated version of the orchestration template.

15. The VNF management system of claim 10, wherein the machine executable instructions, when executed by the processor, cause the processor to generate the updated version of the orchestration template based on user changes.

16. The non-transitory computer readable medium of claim 12, further comprising executable instructions to test and verify the updated version of the orchestration template.

17. The non-transitory computer readable medium of claim 13, further comprising executable instructions to review the updated version of the orchestration template with the integration VNF.

18. The method of claim 1, further comprising promoting the orchestration template in the source repository.

* * * * *